Patented Jan. 10, 1939

2,143,362

UNITED STATES PATENT OFFICE 2,143,362

SODIUM LACTATE AND METHOD OF MANUFACTURE

James F. Walsh, Chicago, Ill., assignor to American Maize-Products Company, a corporation of Maine No Drawing. Application October 25, 1937, Serial No. 170,765

2 Claims. (Cl. 260—535)

My invention relates to the production of sodium lactate and more particularly to a substantially colorless and odorless sodium lactate and its process of manufacture.

Sodium lactate produced by the usual procedure from fermentation liquors results in a product that has considerable color and an undesirable butyric acid odor which render the product unfit for certain intended purposes, such as, use as a softener in papers and textiles. In the usual procedure, sodium lactate is produced by decomposing calcium lactate liquor with sodium carbonate to form sodium lactate. This process briefly consists of the following steps:

First, a carbohydrate material, preferably a sugar, is fermented with a suitable bacillus to produce lactic acid. The fermentation is carried out in the presence of a nutrient and an anti-acid such as calcium carbonate. The function of the anti-acid is to continuously adjust the acidity to the proper pH value during the fermentation cycle, in which lactic acid is first produced by the fermenting bacillus. This lactic acid reacts with the calcium carbonate to form calcium lactate. At the end of the fermentation, that is when practically all of the carbohydrates or sugar have been utilized by the bacillus, there remains a mixture of calcium lactate, a small amount of free lactic acid, excess unreacted calcium carbonate, and the non-utilized portion of the nutrient used.

In the next operation commonly referred to as the killing step, the active organism i. e. bacilli, are killed by heating and all of the lactic acid radicals are converted into their calcium salts, i. e. calcium lactate. This is accomplished by heating the fermented liquor at about 180° F. or higher with sufficient lime to give the mixture a pH of 10 to 12, usually a pH of 11. The resulting calcium lactate liquor is then separated by filtration from the insoluble matter present. The calcium lactate liquor at this stage has usually a dark, reddish brown color, which can be partly reduced by bleaching with a vegetable carbon. Either the bleached or unbleached liquor is then converted to sodium lactate by reacting the liquor with sodium carbonate forming the insoluble salt, calcium carbonate. The insoluble calcium carbonate is separated from the alkaline sodium lactate liquor by filtering and the pH of the filtered sodium lactate is then adjusted to the proper value by adding a suitable acid. The sodium lactate without further chemical treatment is concentrated to the desired concentration, usually 50% sodium lactate.

In the above described conventional process of manufacturing sodium lactate it is to be noted that the sodium lactate is prepared first in a low concentration and then concentrated to the desired strength. During this concentration the impurities contained in the weak sodium lactate, such as, for example, calcium lactate and sodium sulphate, are also concentrated and form a saturated or supersaturated solution. Consequently, the sodium lactate prepared in this manner is subject to the disadvantage of the impurities crystallizing out on standing, thereby rendering the product hazy.

The solubilities of such salts as sodium sulphate and calcium lactate are extremely low in concentrated sodium lactate solutions of over 50 per cent, whereas they are quite soluble in the weaker sodium lactate liquors. In the usual process, sodium lactate is formed in the weak liquor state and then concentrated to the desired strength. During the concentration and especially in the upper range, the solubilities of these salts, calcium lactate and sodium sulphate, decrease quite rapidly and the sodium lactate becomes a supersaturated solution of these salts. If the original concentrations of the salts are within the usual range and if the concentration of sodium lactate is well over 50 per cent, precipitation of calcium lactate and sodium sulphate usually occurs.

This crystallization trouble is avoided in my proposed process since the sodium lactate is produced directly to the desired strength and no concentration is necessary. Also, the amount of calcium lactate and sodium sulphate is minimized by careful adjustments in the preparation of the purified edible lactic acid, and also as calcium sulphate precipitates during the concentration of the acid. Finally during the neutralization of the concentrated acid with alkali, an excess of alkali is used to throw out the traces of metals which may still remain.

An object of my invention is to provide a method and means for producing sodium lactate that is substantially colorless and odorless.

In accordance with my present invention, the desired sodium lactate, which is substantially water white and has no undesirable odor, is obtained by first purifying and concentrating the raw materials or ingredients and then reacting the purified concentrated ingredients to form the sodium lactate product of desired strength and purity. This procedure avoids crystallization of impurities in the final product since the sodium lactate formed does not have to be concentrated.

The improved product of my invention may be obtained by reacting previously purified and concentrated, substantially colorless, lactic acid with concentrated sodium hydroxide, to form immediately a concentrated sodium lactate solution having the desired properties. The concentration of sodium lactate thus formed is controlled by the concentration of the purified lactic acid and the sodium hydroxide used. The concentrated sodium lactate is filtered and bleached if necessary with a suitable bleaching agent, such as, for example, vegetable carbon. The final product resulting from this treatment is water white and practically odorless.

As above suggested, the usual undesirable properties of the lactic acid, such as, for example, color, odor, and metal constituents, are removed before the lactic acid is reacted with the sodium hydroxide. If the metals normally contained in the lactic acid are not removed, they will remain as highly colored substances in the final sodium lactic product. An example of these metal impurities is iron lactate, which has a decided yellow color. In general, the metallic salts, such as, for example, copper and iron salts, if permitted to remain in the sodium lactate solution are slowly reduced and gradually precipitated as a colloidal haze in the sodium lactate solution, imparting to the latter undesirable physical and chemical properties. The purified lactic acid used in the process of my invention is previously treated to remove all of the undesirable metals and other impurities. The usual undesirable odor in the sodium lactate, which is caused by the presence of sodium salts of volatile acids, particularly the sodium salts of butyric acid, is avoided by vacuum treatment of the lactic acid used.

When the concentrated lactic acid is reacted with the concentrated sodium hydroxide to form sodium lactate of the desired strength in accordance with this invention, a considerable amount of heat is developed. If the heat so developed is permitted to raise the temperature of the reacting materials to boiling, an appreciable amount of color will be developed. In my proposed process, however, this color formation is minimized by controlling the temperature of the reaction so that it remains below approximately 160° F. This cooling effect is accomplished by means of any suitable form of cooling surface or coils and also by controlling the rate of the addition of sodium hydroxide to the lactic acid.

In accordance with one specific but non-limiting embodiment of my invention, the desired sodium lactate product of this invention may be produced as follows:

Lactic acid in the form known as edible lactic acid is concentrated under vacuum up to a high strength whereby butyric acid and other odorous volatile acids having a higher vapor pressure than lactic acid are removed. Then to approximately 3000 pounds of this edible lactic acid of approximately 70 per cent strength is added 1900 pounds of 50 Baumé sodium hydroxide. The reaction caused by these two materials produces sodium lactate having a concentration of approximately 50 to 53 per cent. When the reacting materials are used in this proportion the sodium lactate produced thereby contains a slight excess of sodium hydroxide. That is, the sodium lactate solution has a pH of 8 to 9. This alkalinity, I have found, effects maximum removal of aluminum, iron, and other metals. The sodium lactate solution is then filtered to remove the metallic hydroxides that have been precipitated and the filtered solution is bleached with about 50 pounds of vegetable carbon.

The sodium hydroxide is added to the lactic acid carefully and slowly and some suitable cooling means such as cold water coils are used to control the heat so that the temperature of the reacting mixture is kept down to a relatively low value, such as 100° F. to 160° F. At the end of this reaction between the sodium hydroxide and the lactic acid the pH of the resulting solution may be adjusted to about 6.8 or to any desired pH suitable for the intended use of the sodium lactate product.

It is to be understood that various modifications and changes may be made in the process as described hereinabove without departing from the scope of my invention. For example, the sodium hydroxide used may be in either concentrated liquid or in flake form, or a combination of both forms may be used.

Some of the novel features of my invention are defined in the appended claims.

I claim:

1. A process of producing substantially colorless and odorless sodium lactate comprising reacting concentrated lactic acid with an excess of concentrated sodium hydroxide to produce concentrated sodium lactate of over 50% strength, the temperature of the reacting mixture of lactic acid and sodium hydroxide being maintained below about 160° F. by cooling to prevent discoloration of the sodium lactate, said sodium hydroxide being used in sufficient excess to give the resulting sodium lactate solution a pH of about 8–9, and thereby effect maximum precipitation of aluminum and iron as metallic hydroxides, removing said hydroxides, adjusting the pH of the solution to an acid pH and bleaching the resulting acid sodium lactate solution.

2. A process of producing substantially colorless and odorless sodium lactate comprising reacting concentrated lactic acid with an excess of concentrated sodium hydroxide to produce concentrated sodium lactate of over 50% strength, the temperature of the reacting mixture of lactic acid and sodium hydroxide being maintained below about 160° F. by cooling to prevent discoloration of the sodium lactate, said sodium hydroxide being used in sufficient excess to give the resulting sodium lactate solution a pH of about 8–9, and thereby effect maximum precipitation of aluminum and iron as metallic hydroxides, removing said hydroxides, adjusting the pH of the solution to about 6.8 and bleaching the resulting acid sodium lactate solution with vegetable carbon.

JAMES F. WALSH.